US012737151B2

(12) United States Patent
Tamori et al.

(10) Patent No.: US 12,737,151 B2
(45) Date of Patent: Sep. 15, 2026

(54) SIGNAL PROCESSING DEVICE, AUDIO OUTPUT DEVICE, AND SIGNAL PROCESSING METHOD

(71) Applicant: SONY GROUP CORPORATION, Tokyo (JP)

(72) Inventors: Yoshinori Tamori, Tokyo (JP); Shinpei Tsuchiya, Tokyo (JP); Tetsunori Itabashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 96 days.

(21) Appl. No.: 18/848,204

(22) PCT Filed: Feb. 24, 2023

(86) PCT No.: PCT/JP2023/006763
§ 371 (c)(1),
(2) Date: Sep. 18, 2024

(87) PCT Pub. No.: WO2023/189075
PCT Pub. Date: Oct. 5, 2023

(65) Prior Publication Data
US 2025/0217098 A1 Jul. 3, 2025

(30) Foreign Application Priority Data
Mar. 28, 2022 (JP) ................................ 2022-051847

(51) Int. Cl.
*H03G 5/00* (2006.01)
*G06F 3/16* (2006.01)
*H04R 3/00* (2006.01)

(52) U.S. Cl.
CPC .................................. *G06F 3/162* (2013.01)

(58) Field of Classification Search
CPC ...................................................... G06F 3/162
(Continued)

(56) References Cited

FOREIGN PATENT DOCUMENTS

JP 2016-015585 A 1/2016
JP 2022156359 A * 10/2022 ....... G10K 11/17883
WO 2022/009722 A1 1/2022

OTHER PUBLICATIONS

International Search Report and Written Opinion of PCT Application No. PCT/JP2023/006763, issued on May 16, 2023, 09 pages of ISRWO.

* cited by examiner

*Primary Examiner* — Ammar T Hamid
(74) *Attorney, Agent, or Firm* — CHIP LAW GROUP

(57) ABSTRACT

A signal processing device according to the disclosed technology includes an output control section, a frequency analysis section, and a frequency response compilation section. The output control section causes multiple audio output drivers disposed in an audio output device to generate multiple audio outputs with different combinations of output frequency bands of sound signals that are to be outputted respectively from the audio output drivers. The frequency analysis section makes a frequency analysis of a collected-sound signal upon generation of each of the multiple audio outputs, and obtains the frequency response of each of the multiple audio outputs. The frequency response compilation section compiles the frequency response of each of the audio output drivers from the frequency response of each of the audio outputs that is obtained by the frequency analysis section.

15 Claims, 12 Drawing Sheets

(58) Field of Classification Search
USPC ...................................................... 381/96, 98
See application file for complete search history.

CT
DECODER
4
OUTPUT CONTROL SECTION
31
FREQUENCY RESPONSE COMPILATION SECTION
33
FREQUENCY ANALYSIS SECTION
32
3 (FREQUENCY RESPONSE MEASUREMENT SECTION)
NC SIGNAL GENERATION SECTION
11
A/D CONVERSION SECTION
10
AMPLIFICATION SECTION
9
8
ADDITION SECTION
5
D/A CONVERSION SECTION
6
AMPLIFICATION SECTION
7
2
2
2
12
AMPLIFICATION SECTION
13
A/D CONVERSION SECTION
14
1 (HEADPHONE)

FIG. 3
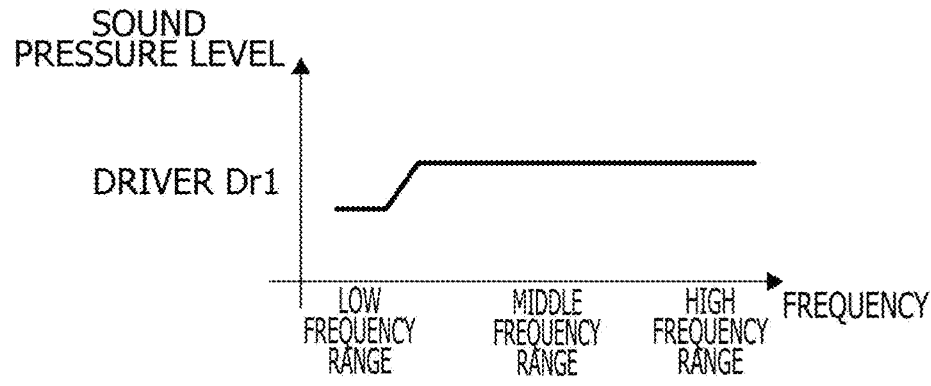
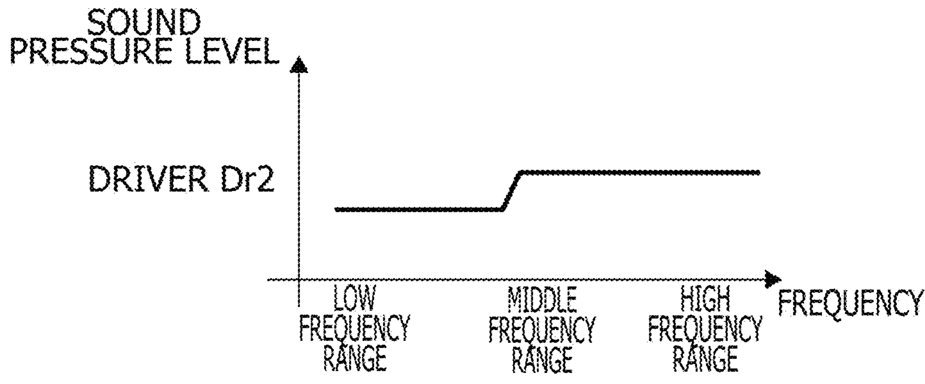
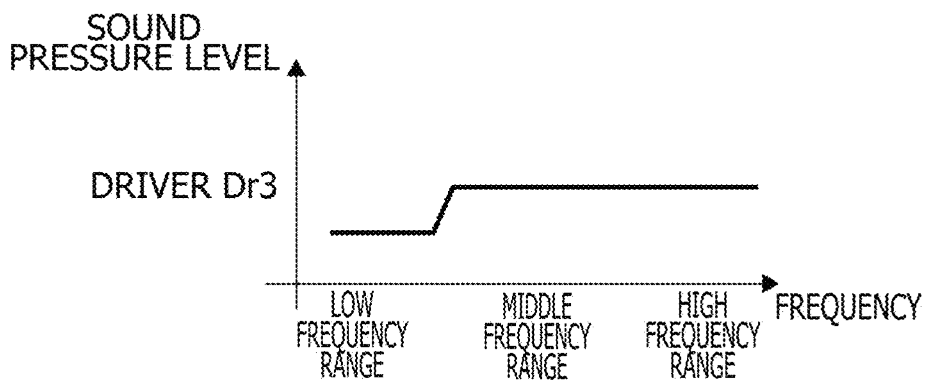

CT
DECODER
4
OUTPUT CONTROL SECTION
31A
FREQUENCY RESPONSE COMPILATION SECTION
33
FREQUENCY ANALYSIS SECTION
32
3A
NC SIGNAL GENERATION SECTION
11
A/D CONVERSION SECTION
10
AMPLIFICATION SECTION
9
8
ADDITION SECTION
5
D/A CONVERSION SECTION
6
AMPLIFICATION SECTION
7
2
2
2
12
A/D CONVERSION SECTION
14
AMPLIFICATION SECTION
13
1A

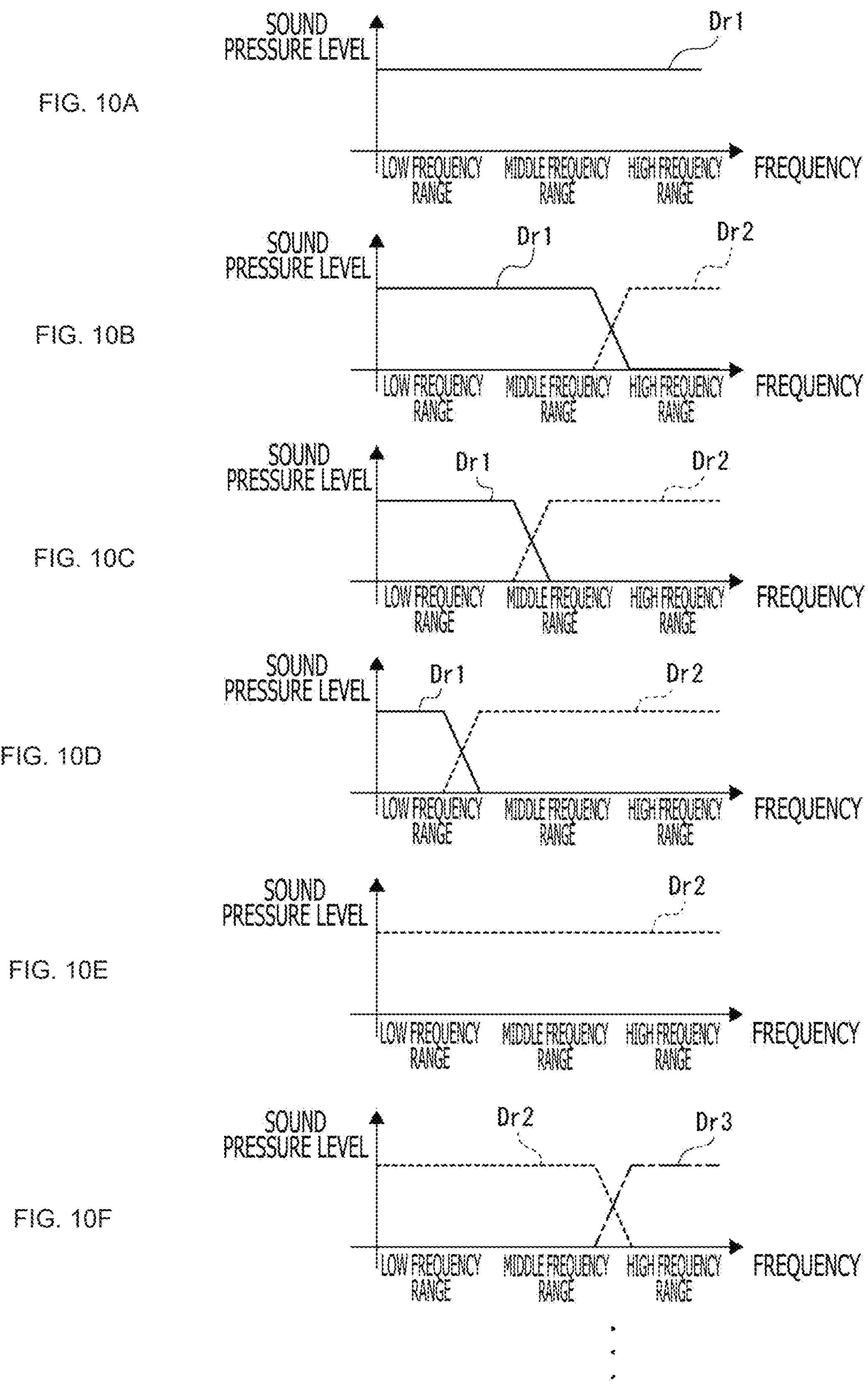
FIG. 10A
SOUND PRESSURE LEVEL
Dr1
LOW FREQUENCY RANGE
MIDDLE FREQUENCY RANGE
HIGH FREQUENCY RANGE
FREQUENCY
FIG. 10B
SOUND PRESSURE LEVEL
Dr1
Dr2
LOW FREQUENCY RANGE
MIDDLE FREQUENCY RANGE
HIGH FREQUENCY RANGE
FREQUENCY
FIG. 10C
SOUND PRESSURE LEVEL
Dr1
Dr2
LOW FREQUENCY RANGE
MIDDLE FREQUENCY RANGE
HIGH FREQUENCY RANGE
FREQUENCY
FIG. 10D
SOUND PRESSURE LEVEL
Dr1
Dr2
LOW FREQUENCY RANGE
MIDDLE FREQUENCY RANGE
HIGH FREQUENCY RANGE
FREQUENCY
FIG. 10E
SOUND PRESSURE LEVEL
Dr2
LOW FREQUENCY RANGE
MIDDLE FREQUENCY RANGE
HIGH FREQUENCY RANGE
FREQUENCY
FIG. 10F
SOUND PRESSURE LEVEL
Dr2
Dr3
LOW FREQUENCY RANGE
MIDDLE FREQUENCY RANGE
HIGH FREQUENCY RANGE
FREQUENCY

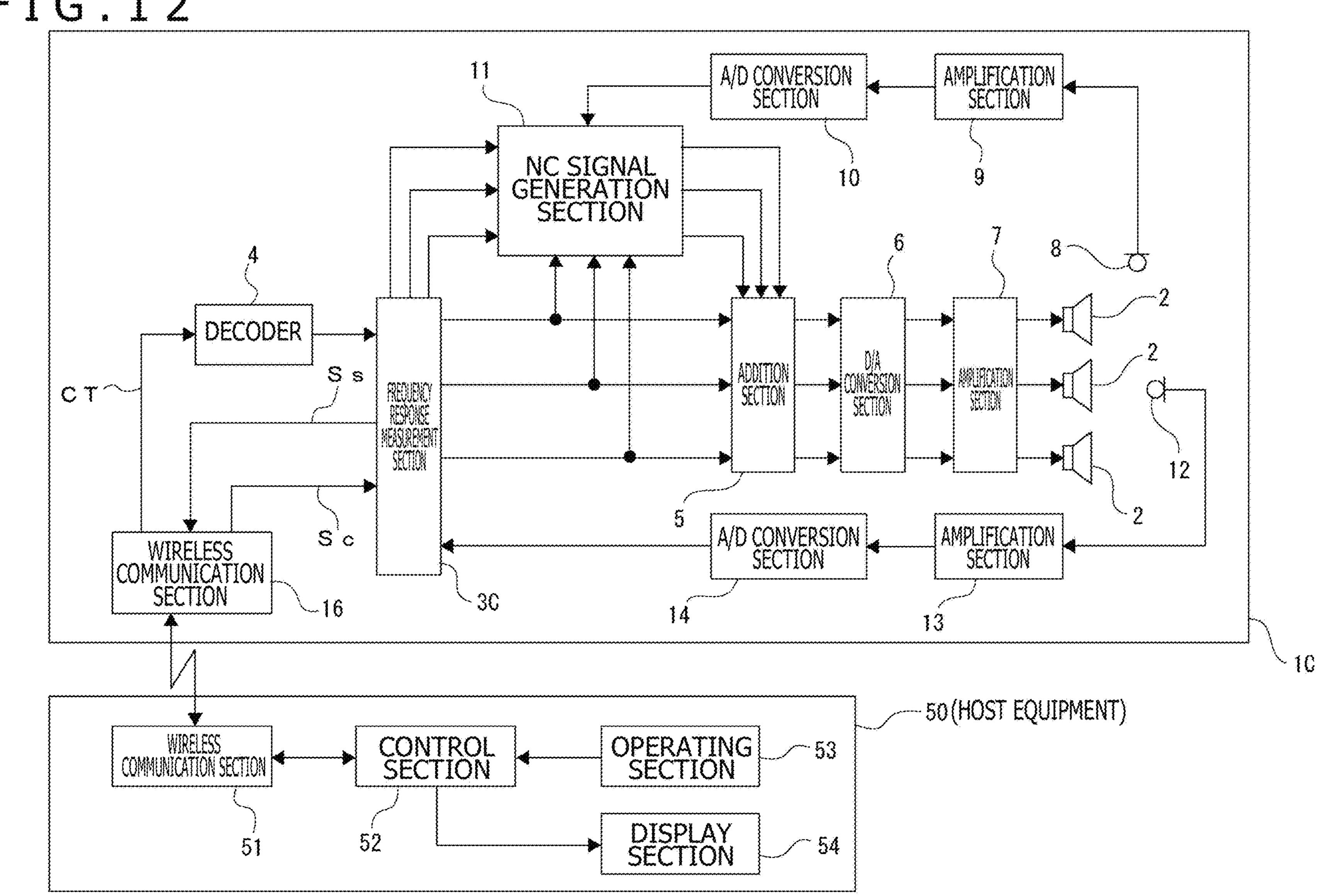
FIG. 12
11
NC SIGNAL GENERATION SECTION
A/D CONVERSION SECTION
10
AMPLIFICATION SECTION
9
8
4
DECODER
CT
Ss
FREQUENCY RESPONSE MEASUREMENT SECTION
ADDITION SECTION
6
D/A CONVERSION SECTION
7
AMPLIFICATION SECTION
2
2
2
12
5
Sc
WIRELESS COMMUNICATION SECTION
16
3C
A/D CONVERSION SECTION
14
AMPLIFICATION SECTION
13
1C
50 (HOST EQUIPMENT)
WIRELESS COMMUNICATION SECTION
51
CONTROL SECTION
52
OPERATING SECTION
53
DISPLAY SECTION
54

SIGNAL PROCESSING DEVICE, AUDIO OUTPUT DEVICE, AND SIGNAL PROCESSING METHOD

CROSS REFERENCE TO RELATED APPLICATIONS

This application is a U.S. National Phase of International Patent Application No. PCT/JP2023/006763 filed on Feb. 24, 2023, which claims priority benefit of Japanese Patent Application No. JP 2022-051847 filed in the Japan Patent Office on Mar. 28, 2022. Each of the above-referenced applications is hereby incorporated herein by reference in its entirety.

TECHNICAL FIELD

The present technology relates to a signal processing device, an audio output device, and a signal processing method, and more particularly, to a technology for measuring frequency response of each audio output driver in a case where an audio output is generated by multiple audio output drivers.

BACKGROUND ART

As disclosed, for example, in PTL 1 below, for audio output devices such as headphones, there is a technology available for collecting a sound outputted from an audio output driver, measuring its frequency response, and adjusting the signal processing of a sound signal (e.g., a noise canceling signal generation process) according to the measured frequency response.

Specifically, a sound based on a measurement signal is outputted from the audio output driver to make a frequency analysis of a collected-sound signal and thus measure the frequency response indicating a sound pressure level and phase of each frequency. For example, in this situation, there is a technology available for measuring the frequency response while a content sound reproduction signal is being outputted instead of the measurement signal. This makes it possible to measure the frequency response without a user knowing.

CITATION LIST

Patent Literature

[PTL 1]
Japanese Patent Laid-open No. 2016-15585

SUMMARY

Technical Problem

It should be noted that headphones and other wearable audio output devices configured to reproduce stereophonic sound, such as 3D (three dimensions) audio and 360-degree audio, have also become popular in recent years. For the headphones used for stereophonic sound reproduction, a multichannel audio output driver (driver unit) is disposed in each of left and right ear units, allowing a user to perceive diverse directional content sound. Incidentally, in the subsequent description, the audio output driver may be sometimes referred to as the "driver."

It is now assumed that the frequency response of an audio output device having multiple drivers as described above is measured. Specifically, the frequency response of each driver is measured in order, for example, to adjust the noise canceling process described above.

When a method in the past is adopted, it is conceivable, for each driver, that a sound signal for measurement is outputted in order to subsequently measure the frequency response based on a collected-sound signal. That is, the sound output and measurement for each driver are performed in a time-sharing manner.

However, when the sound output and measurement for each driver are performed in a time-sharing manner as described above, the following problems occur.

1) Drivers other than those to be measured are silent. This makes it easier for the user to notice that measurements are being made.
2) The sound output and measurement for each driver are performed independently. This makes it necessary to place a certain interval between the sound output and measurement for each driver. As a result, the measurement tends to take a considerable amount of time.
3) Further, when the measurement target is switched from one driver to another, a strange noise may occur due to D/A conversion and give the user a sense of discomfort.

The present technology has been created in view of the above circumstances. An object of the present technology is, in a case where the frequency response of multiple audio output drivers is measured, to shorten the time of measurement while making it difficult for the user to notice that the frequency response is being measured, and to reduce the user's sense of discomfort caused by measurement.

Solution to Problem

A signal processing device according to the present technology includes an output control section, a frequency analysis section, and a frequency response compilation section. The output control section causes multiple audio output drivers disposed in an audio output device to generate multiple audio outputs with different combinations of output frequency bands of sound signals that are to be outputted respectively from the audio output drivers. The frequency analysis section makes a frequency analysis of a collected-sound signal upon generation of each of the multiple audio outputs, and obtains the frequency response of each of the multiple audio outputs. The frequency response compilation section compiles the frequency response of each of the audio output drivers from the frequency response of each of the audio outputs that is obtained by the frequency analysis section.

As described above, the multiple audio outputs are generated with different combinations of output frequency bands of sound signals that are to be outputted respectively from the multiple audio output drivers, and the frequency response of each of the audio output drivers is compiled from the frequency response of each of the audio outputs. Adopting this method eliminates the necessity of sequentially switching the measurement target from one driver to another, and thus eliminates the possibility that one of measurement target audio output drivers becomes silent.

Further, an audio output device according to the present technology includes multiple audio output drivers, a sound collection section, an output control section, a frequency analysis section, and a frequency response compilation section. The sound collection section collects sounds that are outputted from the audio output drivers. The output control section causes the audio output drivers to generate multiple audio outputs with different combinations of output frequency bands of sound signals that are outputted from the audio output drivers. The frequency analysis section makes a frequency analysis of a collected-sound signal that is collected by the sound collection section upon generation of each of the multiple audio outputs, and obtains the frequency response of each of the multiple audio outputs. The frequency response compilation section compiles the frequency response of each of the audio output drivers from the frequency response of each of the audio outputs that is obtained by the frequency analysis section.

The above-described audio output device also provides operations similar to those provided by the signal processing device according to the present technology.

Moreover, a signal processing method according to the present technology that is executed by a signal processing device includes performing an output control process of causing multiple audio output drivers disposed in an audio output device to generate multiple audio outputs with different combinations of output frequency bands of sound signals that are to be outputted respectively from the audio output drivers, performing a frequency analysis process of making a frequency analysis of a collected-sound signal upon generation of each of the multiple audio outputs, and obtaining the frequency response of each of the multiple audio outputs, and performing a frequency response compilation process of compiling the frequency response of each of the audio output drivers from the frequency response of each of the audio outputs that is obtained by the frequency analysis process.

The above-described signal processing method also provides operations similar to those provided by the signal processing device according to the present technology.

BRIEF DESCRIPTION OF DRAWINGS

FIG. 3 is a diagram illustrating a frequency response of each audio output driver in a case where the audio output device is improperly fit.

FIGS. 10A, 10B, 10C, 10D, 10E, and 10F depict explanatory diagrams illustrating the frequency response measurement method according to modifications.

DESCRIPTION OF EMBODIMENTS

Embodiments according to the present technology will now be described in the following order with reference to the accompanying drawings.

<1. First Embodiment>
(1-1. Configuration of Audio Output Device)
(1-2. Frequency Response Measurement Method according to Embodiment)
(1-3. Processing Procedure)
2. Second Embodiment
<3. Modifications>
<4. Summary of Embodiments>
<5. Present Technology>

The embodiments are described below on the assumption that a pair of headphones is used as an example of an audio output device. The description given below deals with an example of listening to 3D audio or other stereophonic sound content. It should be noted that an audio output driver installed in the headphones is hereinafter sometimes referred to also as the "driver."

1. First Embodiment (1-1. Configuration of Audio Output Device)

Figure 1:
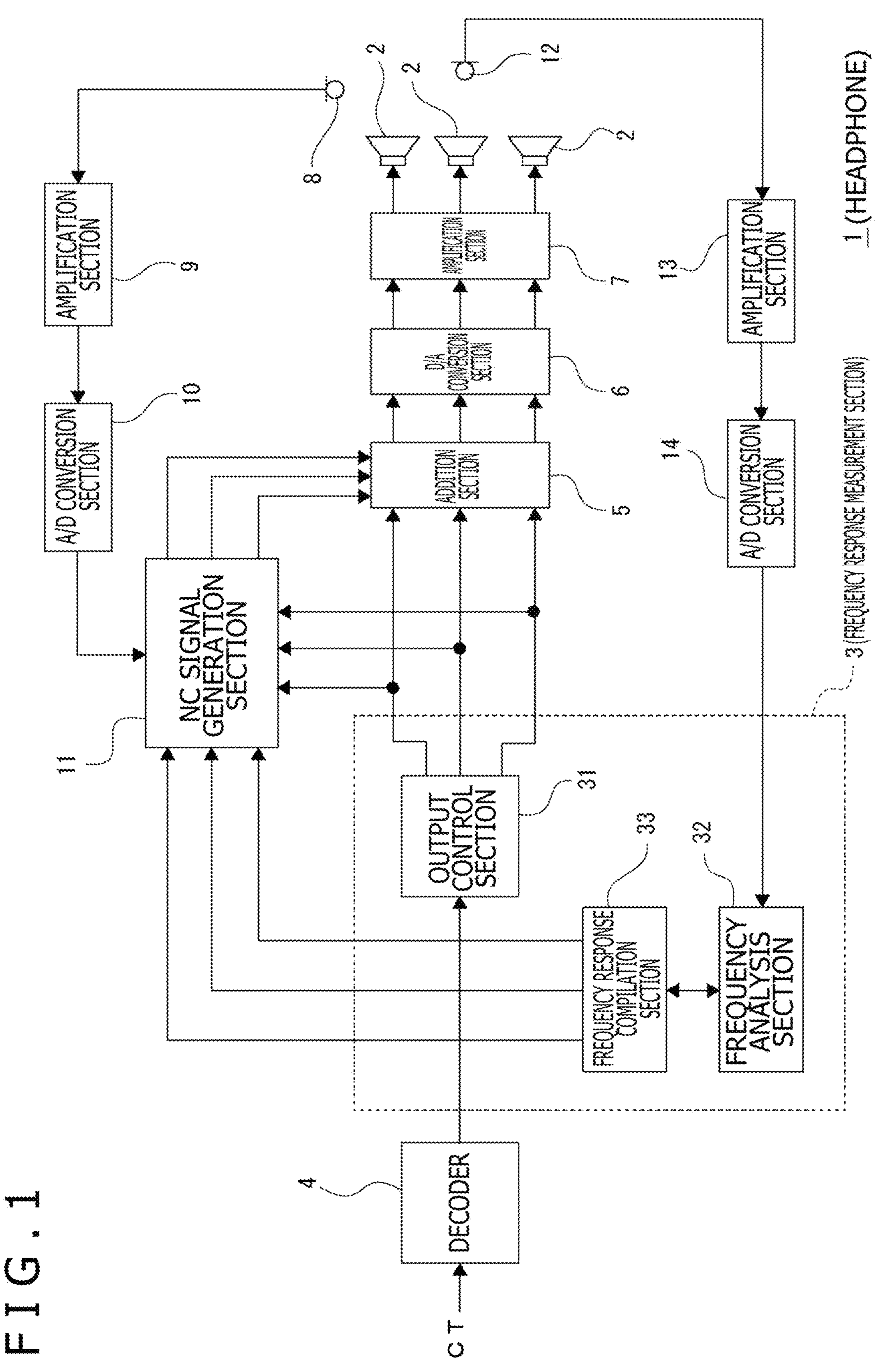
FIG. 1 is a diagram illustrating an example of a configuration of an audio output device according to a first embodiment.

FIG. 1 illustrates an example of the configuration of headphones 1 according to a first embodiment of the audio output device according to the present technology.

As illustrated, the headphones 1 each include multiple drivers 2, a frequency response measurement section 3, a decoder 4, an addition section 5, a D/A (Digital to Analog) conversion section 6, an amplification section 7, a sound collection section 8, an amplification section 9, an A/D (Analog to Digital) conversion section 10, an NC (Noise Canceling) signal generation section 11, a sound collection section 12, an amplification section 13, and an A/D conversion section 14.

The headphones 1 include a group of drivers for generating an audio output for the left ear of a user and a group of drivers for generating an audio output for the right ear of the user. However, as regards the configuration in the output stage of the decoder 4, FIG. 1 depicts the configuration for one of the left and right ears. The configuration for the other ear is similar to the depicted configuration and will not be redundantly depicted.

Here, as an example for explanation, it is assumed that the headphones 1 have three drivers 2 on each of the left and right sides.

Figure 2:
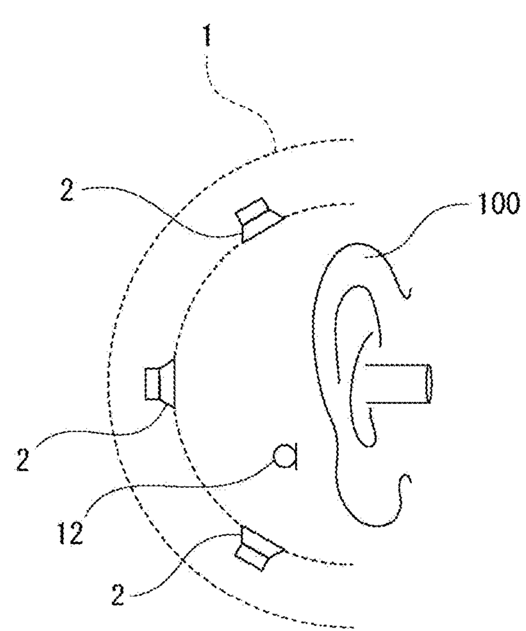
FIG. 2 is a diagram schematically illustrating an example layout of an audio output driver and a sound collection section in the audio output device according to an embodiment.

FIG. 2 schematically illustrates an example layout of the drivers 2 and the sound collection section 12 in the headphones 1.

As illustrated, the multiple drivers 2 are disposed at predetermined positions within a housing of the headphones 1 that covers the user's ears 100. Further, the sound collection section 12 is also disposed at a predetermined position within the housing.

The sound collection section 12 is provided to collect sounds outputted from each driver 2 for the purpose of frequency response measurement described later. Therefore, the sound collection section 12 is disposed within the housing at a position where the sounds outputted from each driver 2 are collectable.

Described with reference to FIG. 1, content sound data CT, which is content sound data such as the data of stereophonic sound content, is transmitted to the headphones 1 from a source external to the headphones 1. It should be noted that the source of the content sound data CT may be disposed inside the headphones 1.

In the present example, the content sound data CT is encoded by a predetermined encoding method, and the decoder 4 obtains a sound signal in the form of a digital signal by decoding the content sound data CT.

In a case where the content sound data CT is stereophonic sound content data, the decoder 4 outputs a sound signal for each driver 2.

It should be noted that the headphones 1 in the present example also support stereo reproduction using two channels, namely, the left and right channels, and that stereo content sound data may be inputted as the content sound data CT. In that case, the decoder 4 outputs a one-channel sound signal for each of the left and right channels. That is, circuit sections for the left and right ears in the output stage of the decoder 4 respectively receive the corresponding outputted one-channel sound signal.

For example, in the headphones 1, the functions of the frequency response measurement section 3 and the NC signal generation section 11 are implemented by one or more microprocessors.

Further, in the headphones 1, a sound signal supply line is formed for each of multiple drivers 2 (three drivers 2 in the present example) that are provided in correspondence with an audio output of stereophonic content.

In a case where sound data of stereophonic sound content is transmitted as the content sound data CT and a sound signal for each driver 2 is inputted from the decoder 4, the frequency response measurement section 3 (a later-described output control section 31) outputs the sound signal for each driver 2 to the supply line for the corresponding driver 2.

The sound signal for each driver 2, which is outputted from the frequency response measurement section 3, is passed through the addition section 5, converted to an analog signal by the D/A conversion section 6, amplified by the amplification section 7, and supplied as a drive signal for each driver 2.

Consequently, each driver 2 generates an audio output based on the corresponding sound signal.

Further, the headphones 1 in the present example have a configuration for noise canceling, which include the sound collection section 8, the amplification section 9, the A/D conversion section 10, the NC signal generation section 11, and the addition section 5. Here, a configuration for performing NC processing by using an FF (feed-forward) method is exemplified as the configuration for noise canceling. However, a configuration for performing NC processing by using an FB (feedback) method may also be applied as the configuration for noise canceling.

The sound collection section 8 includes, for example, one or more microphones, and collects sounds in compliance with the FF method. Specifically, a sound propagated into the housing for the headphones 1 from the outside of the housing is collected as a noise sound. For this reason, the microphone of the sound collection section 8 is positioned, for example, outside the housing so as to be able to collect a sound coming from the outside of the housing.

The sound signal collected by the sound collection section 8 is amplified by the amplification section 9, then converted to a digital signal by the A/D conversion section 10 and outputted to the NC signal generation section 11.

The NC signal generation section 11 treats, as noise, a collected-sound signal which is derived from a sound collected by the sound collection section 8 and inputted through the A/D conversion section 10, that is, collected-sound data of a sound propagated from the outside of the housing, and performs a process of generating an NC signal for canceling the noise. In this instance, when an output from the output control section 31 is inputted to the NC signal generation section 11 as illustrated in FIG. 1, drive signal information for the drivers 2 can be utilized for NC signal generation. In the present example, the NC signal generation section 11 generates the NC signal, for example, by performing a process based on an FF-NC algorithm.

In the present example, the NC signal generation section 11 generates the NC signal for each driver 2, and outputs the NC signal for each driver 2 to the addition section 5.

The addition section 5 adds the NC signal for each driver 2, which is inputted from the NC signal generation section 11, to a corresponding sound signal for each driver 2, which is inputted from the frequency response measurement section 3.

While an NC function is ON, the sound signal to which the NC signal is added by the addition section 5 in the above manner is supplied to the corresponding driver 2 through the D/A conversion section 6 and the amplification section 9. As a result, an NC effect is achieved.

Here, it should be noted that the NC signal generation section 11 in the present example has a function of adjusting an NC signal generation process according to the information regarding the frequency response measured by the frequency response measurement section 3. However, such a function of the NC signal generation section 11 will be described later.

In the headphones 1, the sound collection section 12, the amplification section 13, and the A/D conversion section 14 are provided to enable the frequency response measurement section 3 to measure the frequency response.

The sound collection section 12 includes one or more microphones. As described above, the sound collection section 12 collects a sound outputted from each driver 2. The collected-sound signal which is collected by the sound collection section 12 is amplified by the amplification section 13, and then converted to a digital signal by the A/D conversion section 14 and outputted to the frequency response measurement section 3.

The frequency response measurement section 3 has functions of the output control section 31, the frequency analysis section 32, and the frequency response compilation section 33, and obtains the frequency response of each driver 2 based on the result of output control of sound signals for frequency response measurement and on the result of frequency analysis made according to the collected-sound signal which is collected by the sound collection section 12.

The frequency response measurement section 3 is an embodiment of a signal processing device according to the present technology.

It should be noted that the processing performed according to an embodiment by the frequency response measurement section 3 will be described later.

(1-2. Frequency Response Measurement Method According to Embodiment)

Here, it should be noted that, when the frequency response is measured by making a frequency analysis of a collected-sound signal which is collected by the sound collection section 12 disposed in the housing, it is possible to estimate a fitting state in which the headphones 1 are worn by the user. For example, in a case where the housing is not in sufficient contact with the surroundings of the user's ears 100 due, for instance, to improperly fit headphones 1, the frequency response in which the sound pressure level in a low frequency range (low frequency band) is attenuated is measured because the degree of sealing provided by the housing is lower than the expected degree of sealing.

FIG. 3 illustrates the frequency response (the sound pressure level characteristic of each frequency) of each driver 2 in a case where the headphones 1 are improperly fit as described above.

In the case where the headphones 1 are improperly fit as illustrated in FIG. 3, the frequency response of each driver 2 is such that the sound pressure level in the low frequency range tends to lower. However, the drivers 2 are disposed at different positions. Therefore, the drivers 2 do not necessarily coincide with each other in frequency response, so that the frequency response varies more or less from one driver to another.

Consequently, in a case, for example, where the NC signal generation process performed by the NC signal generation section 11 is to be adjusted according to the result of frequency response measurement, the frequency response of each driver 2 should be separately measured to adjust the NC signal generation process for each driver 2 according to the frequency response of each driver 2.

Figure 4:
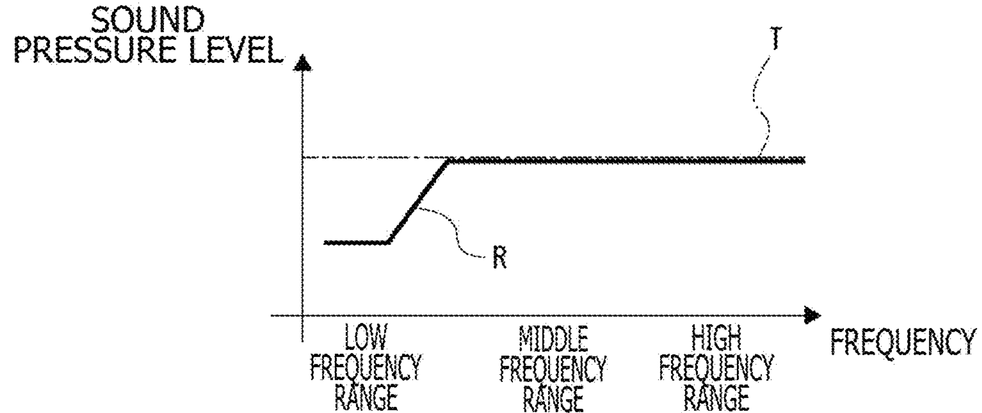
FIG. 4 is an explanatory diagram illustrating an example of sound signal process adjustment based on a measured frequency response.

Here, it is conceivable that the NC signal generation process adjustment to be made by the NC signal generation section 11 may be made based on the difference between a measured frequency response R, which is an actually measured frequency response, and a target frequency response T as depicted, for example, in FIG. 4. That is, the NC signal generation process may be adjusted in such a manner as to eliminate the difference between the measured frequency response R and the target frequency response T.

It should be noted that the above-mentioned difference between the measured frequency response R and the target frequency response T need not essentially be determined for the purpose of NC signal generation process adjustment. When, for example, the adjustment is to be made in order to suppress a decrease in the NC effect caused by improperly fit headphones 1, multiple frequency responses may be defined based on the degree of unfitness caused by the improperly fit headphones 1, and NC signal generation process adjustment parameters for suppressing the decrease in the NC effect may be defined in association with each of the defined frequency responses. The next step may be to determine which of the multiple defined frequency responses correspond to the measured frequency response R. In a case where the corresponding frequency response is found, the NC signal generation process may be performed (i.e., the NC signal generation process may be adjusted) by using the adjustment parameters associated with the corresponding frequency response.

Here, it is conceivable that, when the frequency response of each driver 2 is to be separately measured, sound signal output for measurement and frequency response measurement may be performed in a time-sharing manner for each driver 2.

However, if such a method is adopted, the above-mentioned problems 1) to 3) will occur.

Consequently, the present embodiment is configured such that the frequency response measurement section 3 depicted in FIG. 1 has functions of the output control section 31, the frequency analysis section 32, and the frequency response compilation section 33.

Specifically, the output control section 31 causes the drivers 2 to generate multiple audio outputs with different combinations of output frequency bands of sound signals that are outputted for each driver 2.

Further, the frequency analysis section 32 makes a frequency analysis of a collected-sound signal upon generation of each of the multiple audio outputs, and obtains the frequency response of each of the multiple audio outputs.

Furthermore, the frequency response compilation section 33 compiles the frequency response of each driver 2 from the frequency response of each of the audio outputs that is obtained by the frequency analysis section 32.

In the present example, it is assumed that the frequency response of each driver 2 is measured during the output of a content sound reproduction signal, specifically, during the output of a sound signal as a stereophonic content reproduction signal.

Figure 5A:
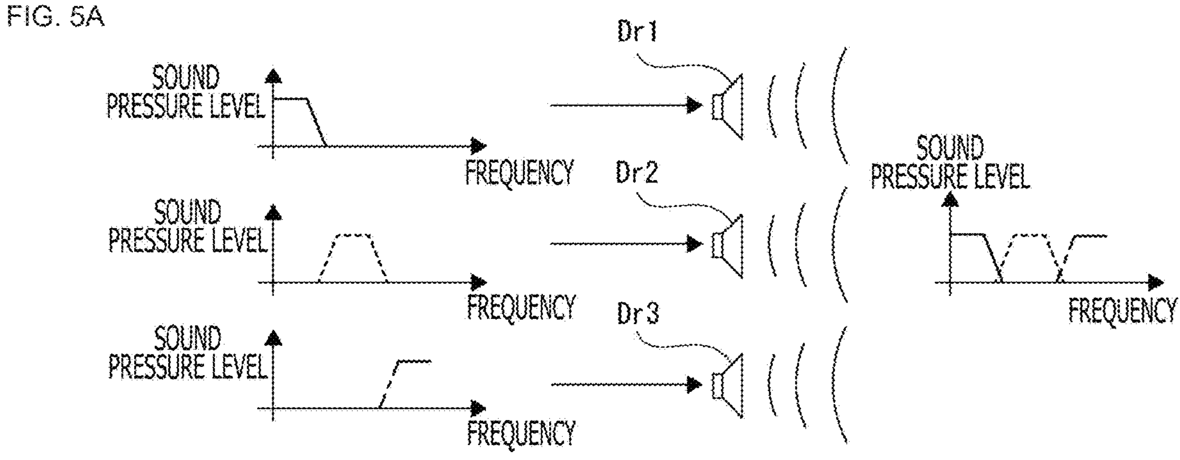
FIGS. 5A, 5B, and 5C depict explanatory diagrams illustrating a specific example of a frequency response measurement method according to an embodiment.
Figure 5B:
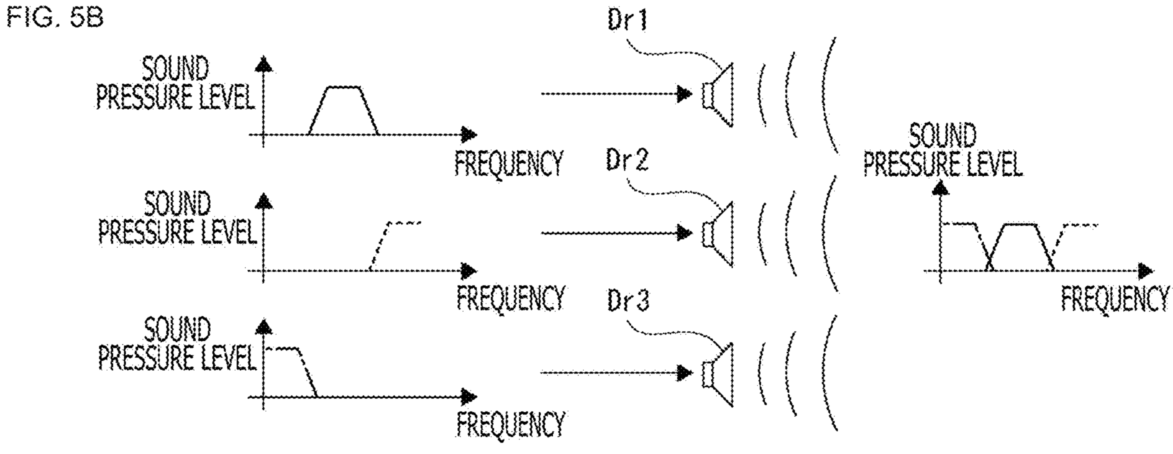
Figure 5C:
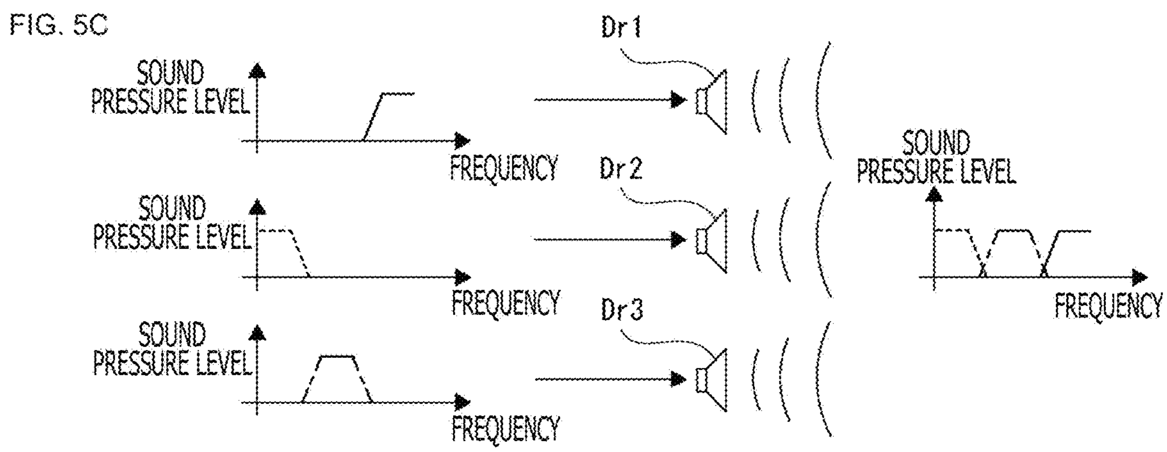

FIGS. 5A, 5B, and 5C are explanatory diagrams illustrating a specific example of a frequency response measurement method according to an embodiment.

The following description deals with a case where there are three drivers 2. When the drivers 2 are distinguished from each other, they are designated by using the reference signs "Dr1," "Dr2," and "Dr3."

First, as depicted in FIG. 5A, the output control section 31 in the frequency response measurement section 3 sets the combination of output frequency bands of sound signals for each driver 2 as a predetermined combination and causes each driver 2 to generate an audio output. Specifically, in this instance, the sound signals for each driver 2 (the sound signals of content sounds in the present example) are outputted while the output frequency bands of the drivers Dr1, Dr2, and Dr3 are treated as the low frequency range, the middle frequency range, and the high frequency range, respectively.

In the above case, as regards the sound signals to be outputted to the driver Dr1, an LPF (low-pass filtering) process is performed on the sound signals for the driver Dr1, which are inputted from the decoder 4, in order to pass only low frequencies. Further, as regards the sound signals to be outputted to the driver Dr2, a BPF (band-pass filtering) process is performed on the sound signals for the driver Dr2, which are inputted from the decoder 4, in order to pass only middle frequencies. As regards the sound signals to be outputted to the driver Dr3, an HPF (high-pass filtering) process is performed on the sound signals for the driver Dr3, which are inputted from the decoder 4, in order to pass only high frequencies.

Subsequently, such this, after each driver 2 is made to generate an audio output while the combination of output frequency bands of sound signals for each driver 2 is set as the predetermined combination, the frequency analysis section 32 obtains the frequency response of the generated audio output by making a frequency analysis of the collected-sound signal which is collected by the sound collection section 12 and inputted through the A/D conversion section 14, according to, for example, Fourier transform such as FFT (Fast Fourier Transform).

Next, as depicted in FIG. 5B, the output control section 31 sets the combination of output frequency bands of sound signals for each driver 2 to a combination different from the combination depicted in FIG. 5A and causes each driver 2 to generate an audio output. Specifically, in this instance, the sound signals for each driver 2 are outputted while the output frequency bands of the drivers Dr1, Dr2, and Dr3 are treated as the middle frequency range, the high frequency range, and the low frequency range, respectively.

Subsequently, such this, after each driver 2 is made to generate an audio output with different combinations of output frequency bands of sound signals for each driver 2, the frequency analysis section 32 obtains the frequency response of the generated audio output by making a frequency analysis of the collected-sound signal which is collected by the sound collection section 12 and inputted through the A/D conversion section 14.

Further, as depicted in FIG. 5C, the output control section 31 causes each driver 2 to generate an audio output while the combination of output frequency bands of sound signals for each driver 2 is set to a combination different from those depicted in FIGS. 5A and 5B. Specifically, in this instance, the sound signals for each driver 2 are outputted while the output frequency bands of the drivers Dr1, Dr2, and Dr3 are treated as the high frequency range, the low frequency range, and the middle frequency range, respectively.

Subsequently, such this, after each driver 2 is made to generate an audio output with different combinations of output frequency bands of sound signals for each driver 2, the frequency analysis section 32 obtains the frequency response of the generated audio output by making a frequency analysis of the collected-sound signal which is collected by the sound collection section 12 and inputted through the A/D conversion section 14.

After, as described above, the output control section 31 causes the driver 2 to generate the multiple audio outputs with different combinations of output frequency bands of sound signals for each driver 2, and then the frequency analysis section 32 obtains the frequency response of each audio output by making a frequency analysis of the collected-sound signal upon generation of each of the multiple audio outputs, the frequency response compilation section 33 compiles the frequency response of each audio output driver from the frequency response of each of the audio outputs that is obtained by the frequency analysis section 32. Specifically, for each driver 2, the frequency response compilation section 33 extracts the frequency response of a frequency band outputted upon generation of the respective audio outputs from the frequency response obtained upon generation of each of the above-mentioned audio outputs, and obtains the frequency response of each driver 2 by combining the extracted frequency responses for each driver 2.

More specifically, in the example of FIGS. 5A, 5B, and 5C, the frequency response compilation section 33 compiles the frequency response of the driver Dr1 in the manner described below. That is, the frequency response in the low frequency range is extracted from the frequency response obtained upon generation of the first audio output (FIG. 5A), the frequency response in the middle frequency range is extracted from the frequency response obtained upon generation of the second audio output (FIG. 5B), the frequency response in the high frequency range is extracted from the frequency response obtained upon generation of the third audio output (FIG. 5C), and then the extracted frequency responses in the individual frequency ranges are combined.

Further, as regards the frequency response of the driver Dr2, the frequency response in the middle frequency range is extracted from the frequency response obtained upon generation of the first audio output, the frequency response in the high frequency range is extracted from the frequency response obtained upon generation of the second audio output, the frequency response in the low frequency range is extracted from the frequency response obtained upon generation of the third audio output, and then the extracted frequency responses in the individual frequency ranges are combined.

Furthermore, as regards the frequency response of the driver Dr3, the frequency response in the high frequency range is extracted from the frequency response obtained upon generation of the first audio output, the frequency response in the low frequency range is extracted from the frequency response obtained upon generation of the second audio output, the frequency response in the middle frequency range is extracted from the frequency response obtained upon generation of the third audio output, and then the extracted frequency responses in the individual frequency ranges are combined.

In the present example, the frequency response compilation section 33 outputs the frequency response of each driver 2 to the NC signal generation section 11 in response to the above-described compilation of frequency response of each driver 2.

Consequently, the NC signal generation section 11 is able to adjust the NC signal generation process for each driver 2 by using, for example, the above-described method.

Note that the above example assumes that, corresponding to a case where there are three drivers 2, the output frequency band of a sound signal at the time of each audio output is divided into three frequency ranges, namely, the low, middle, and high frequency ranges. When, as described above, the number of divisions of the output frequency band of the sound signal at the time of each audio output is the same as the number of drivers 2 to be measured, the measurement time required for obtaining the frequency response of each driver 2 can be minimized. If, for example, the number of target drivers 2 is three and the number of divisions of the output frequency band is two times the number of target drivers 2, that is, six, six different combinations of output frequency bands are required. Accordingly, this increases the required measurement time.

It should be noted that the above description does not intend to limit the number of divisions of the output frequency band of the sound signal to the same number as the number of target drivers 2. The number of divisions of the output frequency band of the sound signal should be at least equal to or greater than the number of target drivers 2.

(1-3. Processing Procedure)

A specific example of the processing procedure for implementing the frequency response measurement method as the above-described embodiment will now be described with reference to the flowchart of FIG. 6. The processing procedure depicted in FIG. 6 may be regarded as a processing procedure when the processing for implementing the frequency response measurement method according to the embodiment is performed by software processing.

First, in step S101, the frequency response measurement section 3 determines the combination of output frequency bands for each driver 2. For example, as illustrated earlier in FIG. 5A, a predetermined combination is defined as the combination of output frequency bands for each driver 2.

In step S102, which follows step S101, the frequency response measurement section 3 performs a process of outputting a sound signal for each driver 2 that is frequency-filtered according to the determination. That is, the sound signal for each driver 2 which is inputted from the decoder 4 is subjected to frequency filtering in order to extract the components of the respective determined output frequency bands, and then the frequency-filtered sound signal for each driver 2 is outputted to the addition section 5.

As a result, each driver 2 generates an audio output of the sound in the frequency band extracted according to the determination.

In step S103, which follows step S102, the frequency response measurement section 3 makes a frequency analysis of the collected-sound signal. That is, the frequency of the collected-sound signal which is collected by the sound collection section 12 and inputted through the A/D conversion section 14, namely, the frequency of the collected-sound signal of the audio output generated by each driver 2 according to the output processing in step S102, is analyzed by Fourier transform. As a result, the frequency response of the audio output is obtained.

In step S104, which follows step S103, the frequency response measurement section 3 determines whether the number of analyses is equal to or greater than M. More specifically, the frequency response measurement section 3 determines whether the number of executions of the frequency analysis in step S103 is equal to or greater than a prescribed number of times M. The prescribed number of times M is the required number of analyses to be made for compiling the frequency response of each driver 2 by using the frequency response measurement method according to the embodiment. In the case of the example depicted in FIGS. 5A, 5B, and 5C, the prescribed number of times M is 3.

If it is determined in step S104 that the number of analyses is not equal to or greater than M, the frequency response measurement section 3 proceeds to step S105, determines a different combination of output frequency bands for each driver 2, and then returns to step S102.

As a result, the frequency analysis is made for the audio output from driver 2 and for the collected-sound signal with the combination of output frequency bands for each driver 2 set to the different combination.

Incidentally, for confirmation, the "different combination" mentioned in step S105 is an alternative combination that is determined for each specific number of analyses.

Meanwhile, if it is determined in step S104 that the number of analyses is equal to or greater than M, the frequency response measurement section 3 proceeds to step S106 and compiles the frequency response of each driver 2. More specifically, for each driver 2, the frequency response of a frequency band outputted upon generation of the respective audio outputs is extracted from the frequency response of each audio output, which is obtained when steps S101 to S105 are performed, and then the extracted frequency responses are combined for each driver 2 to obtain the frequency response of each driver 2.

In step S107, which follows step S106, the frequency response measurement section 3 performs a process of outputting the frequency response of each driver 2 to the NC signal generation section 11.

Figure 6:
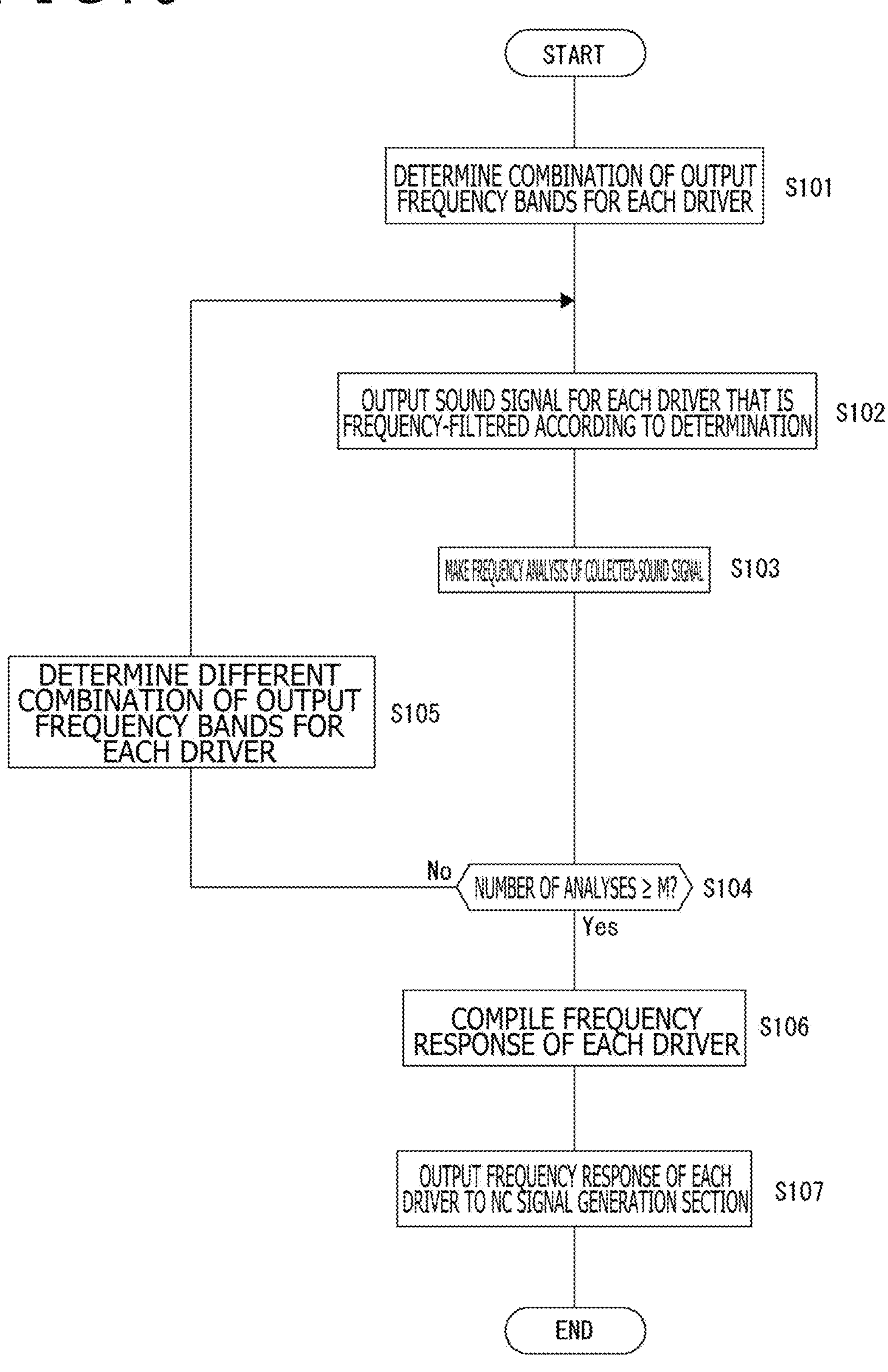
FIG. 6 is a flowchart illustrating an example of a processing procedure for implementing the frequency response measurement method according to the first embodiment.

Upon completion of step S107, the frequency response measurement section 3 ends a series of processes depicted in FIG. 6.

2. Second Embodiment

A second embodiment will now be described.

The second embodiment is configured so as to make it difficult for the user to notice the change of the output frequency band for each driver 2 in a case where measurements are made while a content sound is being outputted.

Incidentally, in the following description, matters similar to those already described are designated by the same reference signs or step numbers as the corresponding ones, and will not be redundantly described.

Figure 7:
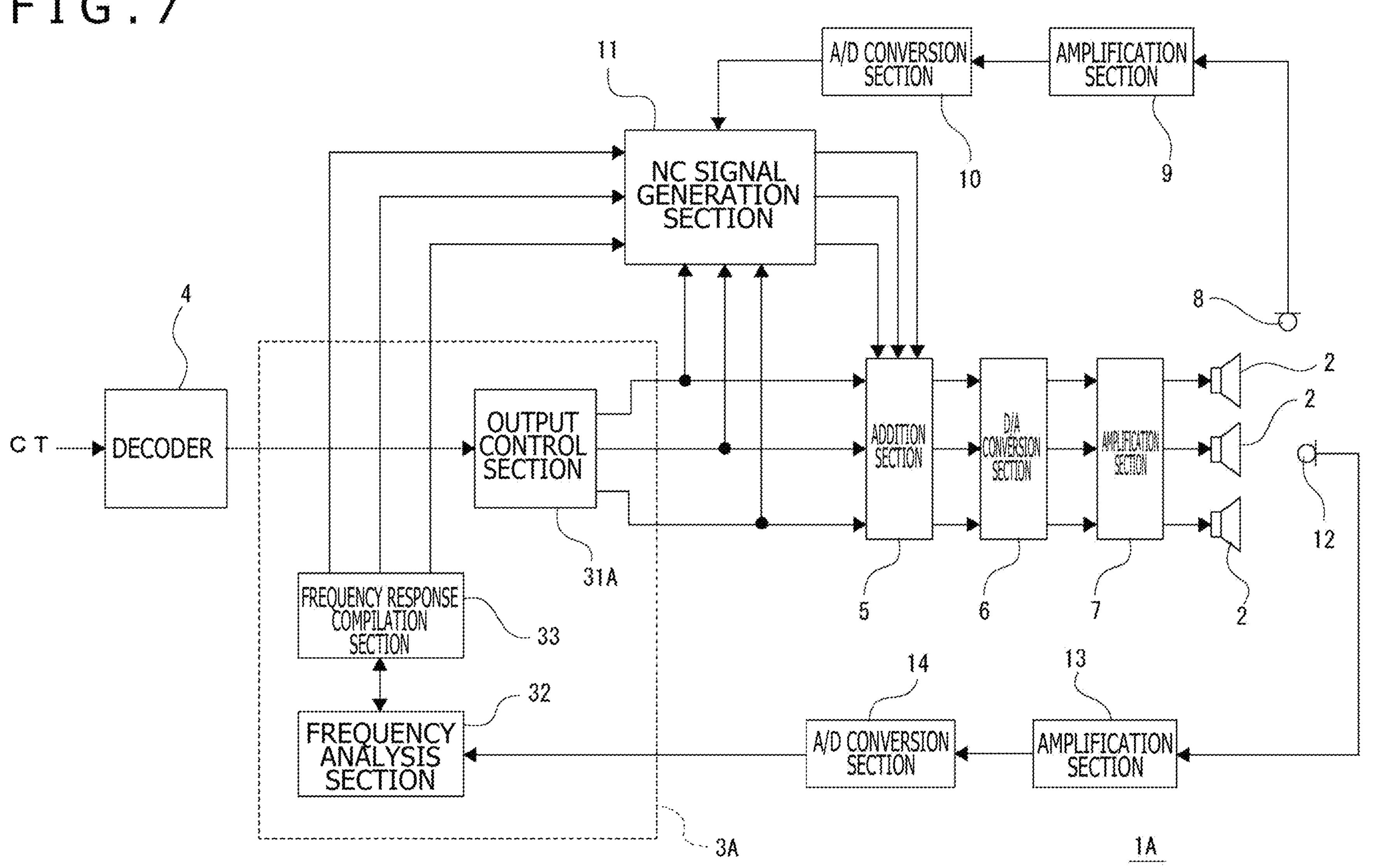
FIG. 7 is a diagram illustrating an example of a configuration of the audio output device according to a second embodiment.

FIG. 7 is a diagram illustrating an example of the configuration of headphones 1A according to the second embodiment.

The headphones 1A are different from the headphones 1 according to the first embodiment in that the headphones 1A include a frequency response measurement section 3A instead of the frequency response measurement section 3.

The frequency response measurement section 3A is different from the frequency response measurement section 3 in that the frequency response measurement section 3A includes an output control section 31A instead of the output control section 31.

Figure 8A:
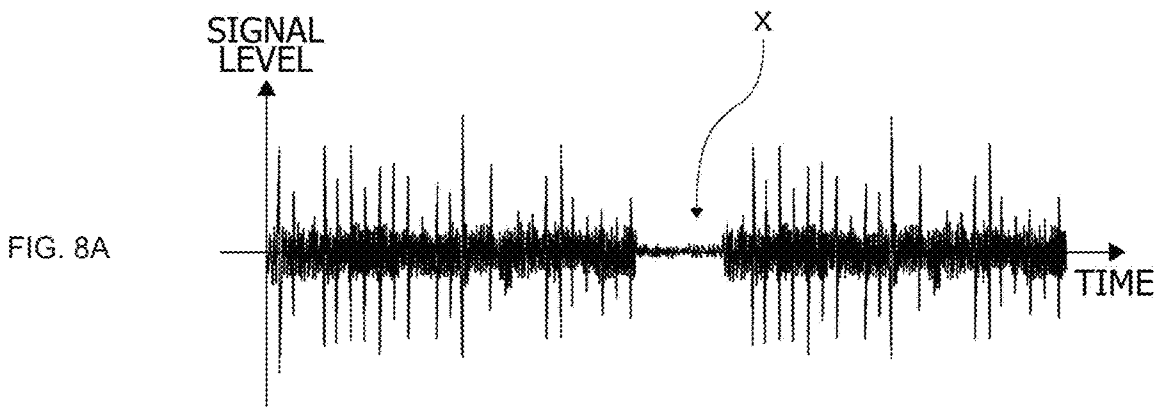
FIGS. 8A and 8B depict explanatory diagrams illustrating a silent period, a soft sound period, and a loud sound period that occur in a content sound.
Figure 8B:
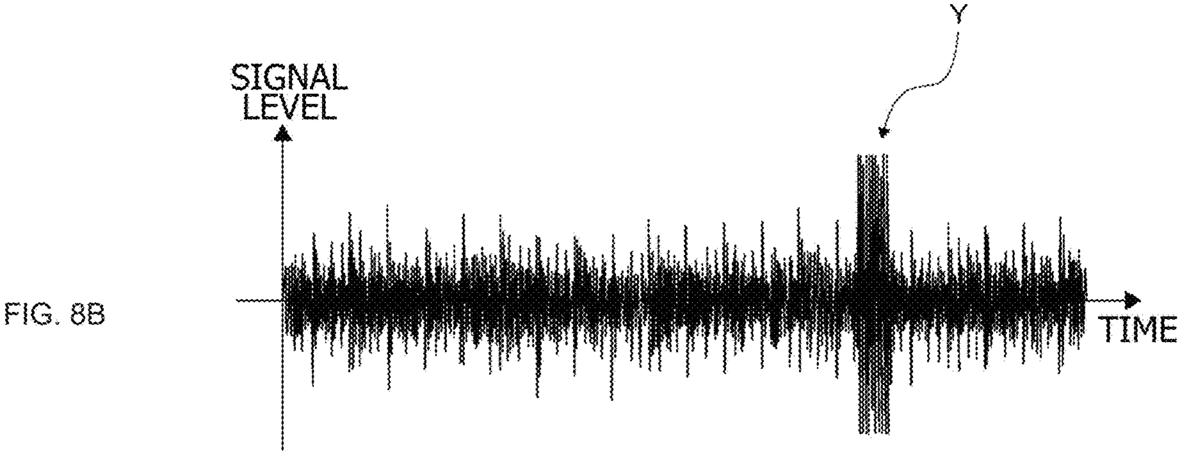

It should be noted that, in the case where measurements are made while a content sound is being outputted, the content sound may have a silent period or an extremely soft sound period that is marked, for example, as X in FIG. 8A, or may have an extremely loud sound period, such as a clipping sound period, that is marked, for example, as Y in FIG. 8B. For example, the period X may exist as a period between songs when the content sound is music. Further, the period Y may exist, for example, as a blasting sound (explosion sound).

In the above-mentioned periods X and Y, even if the output frequency band for each driver 2 is changed, it is difficult for the user to perceive a sound change that is caused by such an output frequency band change. For example, in period X, no sound is reproduced, so that it is difficult for the user to perceive a frequency response change in a reproduced sound even if such a change occurs at the time of output frequency band change. Further, in the period Y, it is difficult for the user to perceive the occurrence of an additional strange noise due to clipping.

Accordingly, the second embodiment adopts a method in which the combination of output frequency bands for each driver 2 is changed during periods corresponding to the periods X and Y, namely, the periods in which a predetermined signal level condition is satisfied by the signal level of a sound signal.

Figure 9:
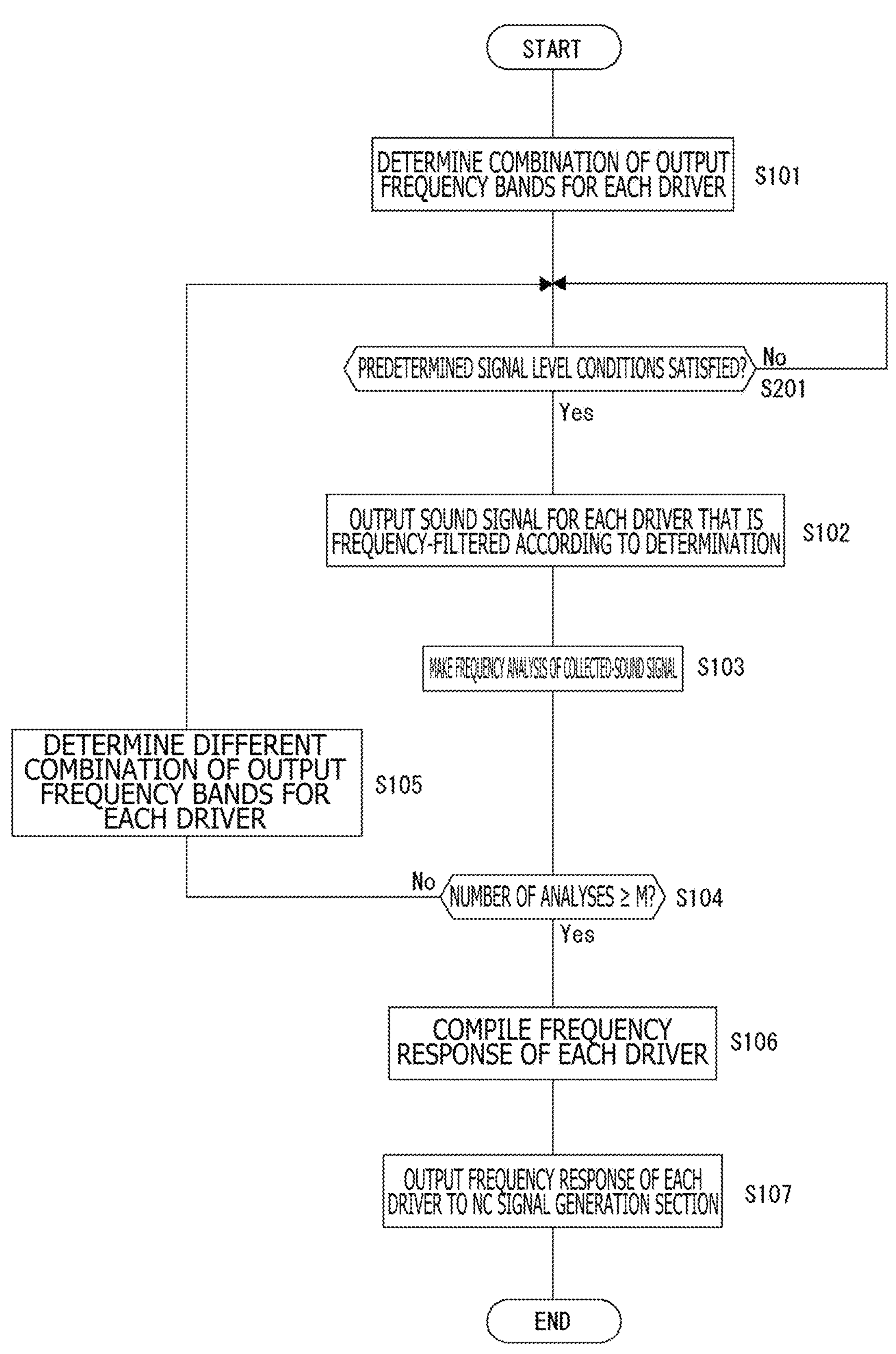
FIG. 9 is a flowchart illustrating an example of the processing procedure for implementing the frequency response measurement method according to the second embodiment.

FIG. 9 is a flowchart illustrating an example of the processing procedure that should be performed by the frequency response measurement section 3A to implement the frequency response measurement method according to the second embodiment.

The frequency response measurement section 3A proceeds to step S201 in response to the determination of the combination of output frequency bands for each driver 2 in step S101.

In step S201, the frequency response measurement section 3A waits until the predetermined signal level condition is satisfied. That is, the frequency response measurement section 3A waits until the signal level of a sound signal inputted from the decoder 4 satisfies the predetermined signal level condition, or more specifically, waits until the signal level is equal to or lower than a predetermined signal level or is equal to or higher than the predetermined signal level.

If it is determined in step S201 that the predetermined signal level condition is satisfied, the frequency response measurement section 3A proceeds to step S102. Steps S102 and beyond are similar to those indicated in FIG. 6, except that the processing returns to step S201 instead of step S102 in response to the processing performed to determine the different combination in step S105.

By the above processing performed by the frequency response measurement section 3A, the output frequency band for each driver 2 is changed during a period in which the predetermined signal level condition is satisfied by the signal level of the sound signal, such as the silent or soft sound period or the loud sound period.

Consequently, it is possible to make it difficult for the user to notice that the frequency response is being measured.

Further, according to the processing depicted in FIG. 9, the predetermined signal level condition is applied as a condition for the execution of audio output of each driver 2 according to the determination in step S101, that is, as a condition for the execution of initial audio output for frequency response measurement.

As a result, when a change is made from the normal output of a content sound (normal output state in which output frequency band division is not performed for each driver 2 for measurement purposes) to the sound output for measurement, it is possible to make it difficult for the user to perceive a sound change caused by such an output state change. That is, in this respect as well, it is possible to make it difficult for the user to notice that the frequency response is being measured.

Although the above example of the "predetermined signal level condition" indicates that the signal level should be equal to or lower than the predetermined signal level or should be equal to or higher than the predetermined signal level, the "predetermined signal level condition" described above may be a signal level condition under which it is estimated that the change in the combination of output frequency bands is not easily perceived by the user.

It should be noted that the above example describes a situation where whether or not the predetermined signal level condition is satisfied is determined in real time. Alternatively, however, the content sound to be reproduced may be analyzed beforehand to predetermine the period during which the predetermined signal level condition is to be satisfied. At the time of measurement, it is appropriate to wait for the arrival of such a predetermined period and then change the combination of output frequency bands for each driver 2 in response to the arrival of the predetermined period.

Further, the above example describes a situation where either the silent or soft sound period or the loud sound period is to be detected. However, it is possible to use an alternative configuration in which both the silent or soft sound period and the loud sound period are to be detected so as to change the combination of output frequency bands in response to the arrival of either one of these periods.

3. Modifications

It should be noted that the embodiments are not limited to the above-described specific examples. The configurations of the above-described embodiments may be variously modified.

Here, in a case where multiple drivers 2 are disposed in each of the left and right headphones 1 (or 1A), a mode for allowing only one driver 2 in each of the left and right headphones to generate an audio output (hereinafter referred to as the "single-driver mode") may be provided, for example, for the purpose of power saving. It should be noted that the single-driver mode may be regarded as a stereo reproduction mode in which each of the left and right headphones generates a one-channel audio output.

A case where the frequency response of each driver 2 is measured in the above-described single-driver mode will now be considered.

In this case as well, if sound output and measurement for each driver 2 are performed in a time-sharing manner as in the use of a method in the past, the switching of the driver 2 is likely to be perceived by the user. Further, the user may feel discomfort due to a strange noise that is caused by D/A conversion following the switching of the driver 2.

Accordingly, a measurement method depicted in FIGS. 10A, 10B, 10C 10D. 10E, and 10F are proposed.

Basically, the frequency response of each driver 2 is measured by generating an audio output in the entire band to be measured for each driver 2. However, when driver switching is to be performed from a switching source driver to a switching destination driver, the width of the output frequency band is gradually changed.

Specifically, FIGS. 10A, 10B, 10C, 10D, 10E, and 10F illustrate an example of output frequency band change at the time of measurement of the frequency response of three drivers 2, namely, the drivers Dr1, Dr2, and Dr3.

First, for the driver Dr1, an audio output is generated with the width of the output frequency band being the width of the entire band to be measured (FIG. 10A). Regarding this audio output, the frequency response of the driver Dr1 is measured based on the collected-sound signal which is collected by the sound collection section 12.

Subsequently, at the time of switching the measurement target from the driver Dr1 to the next driver, namely, the driver Dr2, the width of the output frequency band of each of the drivers Dr1 and Dr2 is gradually changed (FIGS. 10B, 10C, and 10D). Specifically, the output frequency band of the driver Dr1, which has already been measured (i.e., the switching source driver), is gradually narrowed, and the output frequency band of the driver Dr2, which is the next measurement target (i.e., the switching destination driver), is gradually widened, and finally, as depicted in FIG. 10E, the width of the output frequency band is increased to the width of the entire band to be measured. Then, while an audio output is being generated with the width of the output frequency band of the driver Dr2 being the width of the entire band, the frequency response of the driver Dr2 is measured based on the collected-sound signal, which is collected by the sound collection section 12.

Similarly, at the time of switching the measurement target from the driver Dr2 to the driver Dr3, the output frequency band of the driver Dr2, which is the switching source driver, is gradually narrowed, and the output frequency band of the driver Dr3, which is the switching destination driver, is gradually widened (see FIG. 10F). Then, while an audio output is being generated with the width of the output frequency band of the driver Dr3 being the width of the entire band, the frequency response of the driver Dr3 is measured based on the collected-sound signal which is collected by the sound collection section 12.

When the above-described method is adopted in a mode in which the number of drivers 2 to be used is limited, the frequency response of each driver 2 can be measured without giving the user a sense of discomfort and without being noticed by the user.

It should be noted that, even in a case where the method illustrated in FIGS. 10A, 10B, 10C, 10D, 10E, and 10F are adopted, the combination of output frequency bands for each driver 2 can be changed during a period in which the predetermined signal level condition is satisfied by the signal level of a sound signal, as in the case of the second embodiment, which has been described earlier. This makes it more difficult for the user to notice that the frequency response is being measured.

Although the description given above deals with a case where the frequency response of each driver 2 is measured while the content sound reproduction signal is being outputted, the frequency response measurement method according to the present technology can be executed while a measurement sound reproduction signal other than the content sound reproduction signal is being outputted. For example, in a frequency response measurement mode, a measurement sound may be outputted from each driver 2 to measure the frequency response.

In the above instance, a measurement signal for outputting the measurement sound may be any signal that includes a frequency component of the band to be measured. It is conceivable that the measurement signal for outputting the measurement sound may be, for example, a sweep signal or a signal in which multiple sine waves with different frequencies are superimposed.

Further, although not specifically mentioned in the above description, it is conceivable that the frequency response may be measured in accordance with an instruction from the user. That is, in accordance with an instruction from the user, the output control section 31 (or 31A) may control multiple audio outputs, the frequency analysis section 32 may make a frequency analysis, and the frequency response compilation section 33 may compile the frequency response of each driver 2.

Figure 11:
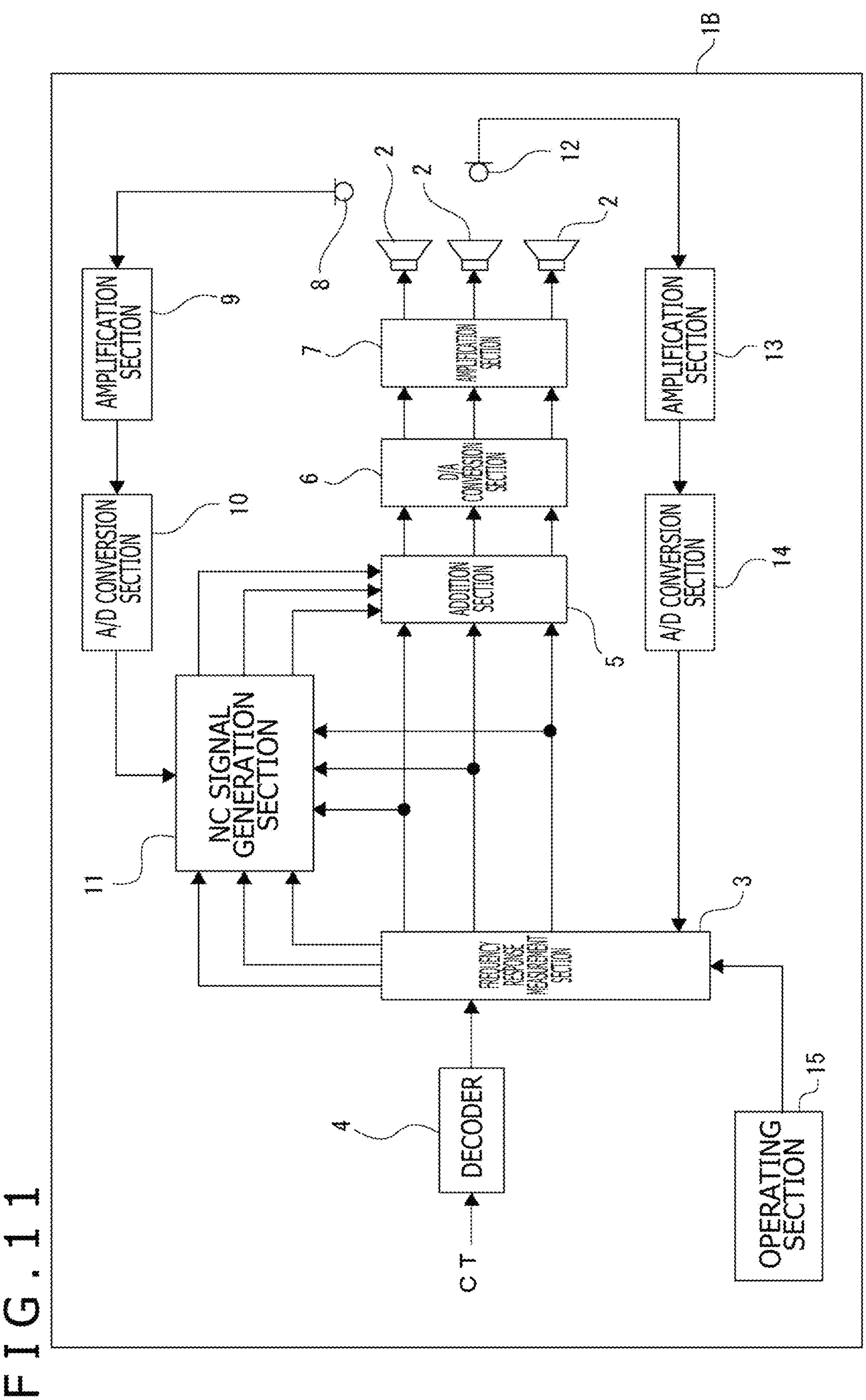

For example, in a case where the headphones include an operating section 15 that allows the user to make an operation input, as in the case of headphones 1B depicted in FIG. 11, the frequency response measurement section 3 measures the frequency of each driver 2 by using the method according to the above-described embodiments in accordance with an instruction from the user, which is specified by an operation input to the operating section 15.

Alternatively, in the case of headphones 1C, which are depicted, for example, in FIG. 12 and configured to be able to wirelessly communicate with an external device, namely, host equipment 50, the instruction from the user may be given through a user interface of the host equipment 50.

In FIG. 12, the host equipment 50 is configured as a computer device such as a smartphone or a tablet computer, for example, and includes, as illustrated, a wireless communication section 51, a control section 52, an operating section 53, and a display section 54.

Further, in FIG. 12, the headphones 1C are different from the headphones 1 according to the first embodiment in that a wireless communication section 16 is added, and that a frequency response measurement section 3C is provided instead of the frequency response measurement section 3.

In the host equipment 50, the control section 52 includes a microcomputer having, for example, a CPU (Central Processing Unit), a ROM (Read Only Memory), and a RAM (Random Access Memory), and exercises overall control of the host equipment 50.

The control section 52 is connected to the operating section 53, the display section 54, and the wireless communication section 51.

The operating section 53 is a comprehensive representation of physical operating elements, such as various buttons, and operating elements, such as a touch screen, which are used by the user to make an operation input to the host equipment 50. The operating section 53 outputs an operation signal which is based on the operation input to the control section 52. The control section 52 interprets the operation input according to the operation signal.

Further, the display section 54 is configured, for example, as an LCD (Liquid Crystal Display) or an organic EL (Electro-Luminescence) display, and displays images in accordance with the instructions from the control section 52.

The wireless communication section 51 performs wireless data communication with the wireless communication section 16 in the headphones 1C. It is conceivable that the wireless communication between these wireless communication sections 51 and 16 may be performed in compliance with a short-range wireless communication standard such as the BL (Bluetooth (registered trademark)) standard. Alternatively, the wireless communication between the wireless communication sections 51 and 16 may be performed through a network such as a LAN (Local Area Network).

In the above case, the content sound data CT transmitted from the host equipment 50 through the wireless communication section 51 is inputted to the decoder 4 in the headphones 1C through the wireless communication section 16. As a result, each driver 2 in the headphones 1C generates an audio output based on a sound signal wirelessly outputted from an external device, namely, the host equipment 50.

Subsequently, the frequency response measurement section 3C in the headphones 1C measures the frequency response of each driver 2 by using the method according to the above-described embodiments according to a user operation performed on the operating section 53 of the host equipment 50.

For example, in a case where the frequency response is measured while a content sound is being outputted, as assumed in the description of the first and second embodiments, a user's instruction for measuring the frequency response during the output of the content sound (hereinafter referred to as the "content reproduction period execution instruction") is issued by an operation performed on the operating section 53 of the host equipment 50. Then, the control section 52 of the host equipment 50 outputs an execution instruction signal Sc indicating such a content reproduction period execution instruction to the headphones 1C through the wireless communication section 51. The execution instruction signal Sc is inputted to the frequency response measurement section 3C through the wireless communication section 16. Then, according to the execution instruction signal Sc, the frequency response measurement section 3C measures the frequency response during the output of the content sound by using the method described in conjunction with the foregoing embodiments.

In some cases, as mentioned earlier, the frequency response may be measured by outputting a measurement sound other than the content sound. In such cases, for example, an instruction for executing a frequency response measurement in a measurement mode is issued by an operation performed on the operating section 53 of the host equipment 50, so that an instruction signal for executing such a frequency response measurement in the measurement mode is inputted to the frequency response measurement section 3C of the headphones 1C as the execution instruction signal Sc. In response to the input of the execution instruction signal Sc, the frequency response measurement section 3C measures the frequency response of each driver 2 by outputting a measurement signal that changes the combination of output frequency bands for each driver 2 as described in conjunction with the foregoing embodiments.

Here, if it is assumed here that an audio output system including the host equipment 50 depicted in FIG. 12 is used, based on the measured frequency response of each driver 2, the frequency response measurement section 3C may exercise control to notify, through the host equipment 50, the user of the fitting state of the headphones 1C.

Specifically, in a case where the earlier-mentioned improper fitting state of the headphones 1C is indicated by the result of frequency response measurement for each driver 2, the frequency response measurement section 3C outputs a notification instruction signal Ss for instructing the control section 52 to issue the above-mentioned notification, so that notification information indicating the occurrence of improper fitting appears on the display section 54 of the host equipment 50.

It should be noted that a smartphone or a tablet computer has been illustrated as an example of the host equipment 50. However, it is conceivable that the host equipment 50 may alternatively be, for example, an HMD (head-mounted display), a personal computer, or a television receiver. Further, it is also conceivable that the host equipment 50 may be equipment without the display section 54, such as a stationary game console. In such a case, it is conceivable that an external display device attached to such equipment displays the notification of improper fitting. Even in that case, the notification is still "issued to the user through the external display device."

Further, the notification of the fitting state is not limited to visual information presentation. It is conceivable that such a notification may be issued by auditory or tactile information presentation.

In the description given so far, the frequency sound pressure level characteristic indicating the sound pressure level characteristic of each frequency has been cited as an example of the measured frequency response of each driver 2. However, for instance, the frequency phase characteristic indicating the phase characteristic of each frequency may also be cited as an example of the frequency response.

As regards the present technology, the frequency response may be obtained by measuring the sound characteristics of each frequency.

Further, the description given so far relates to an example in which the result of measurement of the frequency response of each driver 2 is used for adjusting the NC signal generation process. Alternatively, however, the result of such measurement may be used for adjusting a process other than the NC signal generation process, such as an equalization process.

Further, the description given so far relates to an example in which the sound collection section 12 used for frequency response measurement is provided separately from the sound collection section 8 used for NC signal generation. However, for example, in a case where the FB method is used for NC signal generation, the sound collection section 12 may also be used as a sound collection section for NC signal generation.

Moreover, the description given so far relates to an example in which three drivers 2 are provided on each of the left and right sides. However, the present technology can be suitably applied to a case where at least two drivers 2 are provided on each of the left and right sides.

Additionally, in the description given so far, headphones have been cited as an example of the audio output device. However, the present technology can also be applied to other audio output devices such as various types of earphones including those of an in-ear type and a canal type.

The present technology can be suitably applied to a wearable audio output device that is worn on a user's ear.

4. Summary of Embodiments

As described above, according to an embodiment, there is provided a signal processing device (frequency response measurement section 3, 3A, 3C) that includes an output control section (output control section 31, 31A), a frequency analysis section (frequency analysis section 32), and a frequency response compilation section (frequency response compilation section 33). The output control section causes multiple audio output drivers (drivers 2) disposed in an audio output device to generate multiple audio outputs with different combinations of output frequency bands of sound signals that are to be outputted respectively from the audio output drivers. The frequency analysis section makes a frequency analysis of a collected-sound signal upon generation of each of the multiple audio outputs, and obtains the frequency response of each of the multiple audio outputs. The frequency response compilation section compiles the frequency response of each of the audio output drivers from the frequency response of each of the audio outputs that is obtained by the frequency analysis section.

As described above, the multiple audio outputs are generated with different combinations of output frequency bands of sound signals that are to be outputted respectively from the multiple audio output drivers, and the frequency response of each of the audio output drivers is compiled from the frequency response of each of the audio outputs. Adopting this method eliminates the necessity of sequentially switching the measurement target from one driver to another, and thus eliminates the possibility that one of the measurement target audio output drivers becomes silent.

Consequently, in a case where the frequency response of multiple audio output drivers is measured, the present embodiment makes it possible to shorten the time of measurement while making it difficult for the user to notice that the frequency response is being measured, and to reduce the user's sense of discomfort caused by measurement.

Further, in the signal processing device according to an embodiment, the frequency response compilation section extracts, from the frequency response of each audio output, the frequency responses of frequency bands that are outputted upon generation of the respective audio outputs, and combines the extracted frequency responses for each audio output driver.

Consequently, the frequency response of each audio output driver can be properly obtained from the frequency response for each of multiple audio outputs generated with different combinations of output frequency bands of sound signals.

Further, in the signal processing device according to an embodiment, the output control section outputs the reproduction signal of a content sound as the sound signal at the time of generation of the multiple audio outputs.

Consequently, the frequency response can be measured while the user is listening to the content sound such as music.

As a result, there is no need to output a measurement signal other than the reproduction signal of the content sound at the time of frequency response measurement, making it difficult for the user to notice that measurements are being made. Further, there is no need to interrupt the user while the user is listening to the content sound or prompt the user to perform a measurement operation. This makes it possible to provide increased convenience.

Further, in the signal processing device according to an embodiment, the output control section outputs a stereophonic content reproduction signal as the sound signal at the time of generation of the multiple audio outputs.

Consequently, the frequency response can be measured while the user is listening to stereophonic content.

Moreover, in the signal processing device (frequency response measurement section 3A) according to an embodiment, the output control section (output control section 31A) changes the combination of output frequency bands for each audio output driver during a period in which a predetermined signal level condition is satisfied by the signal level of the sound signal.

Consequently, the combination of output frequency bands for each audio output driver can be changed, for example, during a silent period between songs, during a period in which a blasting sound clips, or other periods in which the predetermined signal level condition is satisfied to make it difficult for the user to perceive the change in the combination of output frequency bands.

As a result, it is possible to make it difficult for the user to notice that the frequency response is being measured.

Additionally, in the signal processing device according to an embodiment, the output control section makes the above change during a period in which the signal level of the sound signal is equal to or lower than a predetermined signal level.

Consequently, the combination of output frequency bands for each audio output driver can be changed during a silent period between songs or other periods in which the change in the combination of output frequency bands is not easily perceived by the user due to a low signal level of an output sound for measurement.

As a result, it is possible to make it difficult for the user to notice that the frequency response is being measured.

Further, in the signal processing device according to an embodiment, the output control section makes the change during a period in which the signal level of the sound signal is equal to or higher than the predetermined signal level.

Consequently, the combination of output frequency bands for each audio output driver can be changed, for example, during a period in which a blasting sound clips, or other periods in which the change in the combination of output frequency bands is not easily perceived by the user due to a high signal level of the output sound for measurement.

As a result, it is possible to make it difficult for the user to notice that the frequency response is being measured.

Furthermore, the signal processing device according to an embodiment includes a signal process adjustment section (NC signal generation section 11) that adjusts a sound signal process for each audio output driver according to the frequency response of each audio output driver that is obtained by the frequency response compilation section.

Consequently, sound effects produced by the sound signal process for each audio output driver can be adjusted based on the frequency response that is actually measured for each audio output driver.

As a result, the sound effects produced by the sound signal process for each audio output driver can be adaptively adjusted according to the user's actual usage environment.

Moreover, in the signal processing device according to an embodiment, the signal process adjustment section adjusts a noise canceling signal generation process for each audio output driver according to the frequency response of each audio output driver.

Consequently, a noise canceling process for each audio output driver can be adaptively adjusted according to the user's actual usage environment.

Additionally, in the signal processing device according to an embodiment, in accordance with an instruction from the user, the output control section controls the multiple audio outputs, the frequency analysis section makes a frequency analysis, and the frequency response compilation section compiles the frequency response of each audio output driver.

Consequently, the frequency response of each audio output driver can be measured in a proper execution mode according to the user's intention.

According to an embodiment, there is provided an audio output device (headphones 1, 1A, 1B, 1C) that includes multiple audio output drivers, a sound collection section, an output control section, a frequency analysis section, and a frequency response compilation section. The sound collection section collects sounds that are outputted from the audio output drivers. The output control section causes the audio output drivers to generate multiple audio outputs with different combinations of output frequency bands of sound signals that are outputted from the audio output drivers. The frequency analysis section makes a frequency analysis of a collected-sound signal that is collected by the sound collection section upon generation of each of the multiple audio outputs, and obtains the frequency response of each of the multiple audio outputs. The frequency response compilation section compiles the frequency response of each of the audio output drivers from the frequency response of each of the audio outputs that is obtained by the frequency analysis section.

The above-described audio output device also provides operations and advantages similar to those provided by the above-described signal processing device according to an embodiment.

Further, in the audio output device (headphones 1C) according to an embodiment, the audio output drivers are configured to be able to wirelessly communicate with an external device and configured to generate an audio output according to a sound signal wirelessly outputted from the external device.

Consequently, in a case, for example, where an adopted device configuration is for generating an audio output according to the sound signal wirelessly outputted from the external device, such as a smartphone or a tablet computer, the frequency response of each audio output driver can be properly measured.

Furthermore, in the audio output device (headphones 1C) according to an embodiment, in accordance with an instruction given by the user through a user interface of the external device, the output control section controls the multiple audio outputs, the frequency analysis section makes a frequency analysis, and the frequency response compilation section compiles the frequency response of each audio output driver.

Consequently, the frequency response of each audio output driver can be measured in a proper execution mode according to the user's intention.

Moreover, the audio output device (headphones 1C) according to an embodiment is configured as a wearable audio output device worn on the user's ear, and configured to exercise control to issue a notification indicating the fitting state of the audio output device to the user through the external device according to the frequency response of each audio output driver that is obtained by the frequency response compilation section.

Consequently, in response to a case, for example, where the result of frequency response measurement indicates that the audio output device is estimated to be improperly fit, a notification indicating such improper fitting can be issued to the user, for example, through a display or speaker of the external device.

As a result, it is possible to provide an excellent audio output system that is able to notify the user of the fitting state of the audio output device according to the estimated fitting state.

Additionally, according to an embodiment, there is provided a signal processing method that is executed by a signal processing device. The signal processing method includes performing an output control process of causing multiple audio output drivers disposed in an audio output device to generate multiple audio outputs with different combinations of output frequency bands of sound signals that are to be outputted respectively from the audio output drivers, performing a frequency analysis process of making a frequency analysis of a collected-sound signal upon generation of each of the multiple audio outputs, and obtaining the frequency response of each of the multiple audio outputs, and performing a frequency response compilation process of compiling the frequency response of each of the audio output drivers from the frequency response of each of the audio outputs that is obtained by the frequency analysis process.

The above-described signal processing method also provides operations and advantages similar to those provided by the above-described signal processing device according to an embodiment.

It should be noted that the advantages described in this document are merely illustrative and not restrictive. The present technology can additionally provide advantages other than those described in this document.

5. Present Technology

The present technology can also adopt the following configurations.

(1)

A signal processing device including:

an output control section that causes multiple audio output drivers disposed in an audio output device to generate multiple audio outputs with different combinations of output frequency bands of sound signals that are to be outputted respectively from the audio output drivers;

a frequency analysis section that makes a frequency analysis of a collected-sound signal upon generation of each of the multiple audio outputs, and obtains the frequency response of each of the multiple audio outputs; and a frequency response compilation section that compiles the frequency response of each of the audio output drivers from the frequency response of each of the audio outputs that is obtained by the frequency analysis section.

(2)

The signal processing device according to (1) above, in which the frequency response compilation section extracts, from the frequency response of each of the audio outputs, the frequency responses of frequency bands that are outputted upon generation of the respective audio outputs, and combines the extracted frequency responses for each of the audio output drivers.

(3)

The signal processing device according to any one of (1) or (2) above, in which the output control section outputs a reproduction signal of a content sound as a sound signal at the time of generation of the multiple audio outputs.

(4)

The signal processing device according to any one of (1) to (3) above, in which the output control section outputs a reproduction signal of stereophonic content as the sound signal at the time of generation of the multiple audio outputs.

(5)

The signal processing device according to any one of (3) or (4) above, in which the output control section changes a combination of output frequency bands for each of the audio output drivers during a period in which a predetermined signal level condition is satisfied by a signal level of the sound signal.

(6)

The signal processing device according to (5) above, in which the output control section performs the change during a period in which the signal level of the sound signal is equal to or lower than a predetermined signal level.

(7)

The signal processing device according to (5) or (6) above, in which the output control section changes the combination of output frequency bands for each of the audio output drivers during a period in which the signal level of the sound signal is equal to or higher than a predetermined signal level.

(8)

The signal processing device according to any one of (1) to (7) above, further including:

a signal process adjustment section that adjusts a sound signal process for each of the audio output drivers according to the frequency response of each of the audio output drivers that is obtained by the frequency response compilation section.

(9)

The signal processing device according to (8) above, in which the signal process adjustment section adjusts a noise canceling signal generation process for each of the audio output drivers according to the frequency response of each of the audio output drivers.

(10)

The signal processing device according to any one of (1) to (9) above, in which, in accordance with an instruction from a user, the output control section controls the multiple audio outputs, the frequency analysis section makes a frequency analysis, and the frequency response compilation section compiles the frequency response of each of the audio output drivers.

(11)

An audio output device including:

multiple audio output drivers;

a sound collection section that collects sounds outputted from the audio output drivers;

an output control section that causes the audio output drivers to generate multiple audio outputs with different combinations of output frequency bands of the sound signals that are to be outputted respectively from the audio output drivers;

a frequency analysis section that makes a frequency analysis of a collected-sound signal that is collected by the sound collection section upon generation of each of the multiple audio outputs, and obtains the frequency response of each of the multiple audio outputs; and a frequency response compilation section that compiles the frequency response of each of the audio output drivers from the frequency response of each of the multiple audio outputs that is obtained by the frequency analysis section.

(12)

The audio output device according to (11) above, in which the audio output drivers are configured to be able to wirelessly communicate with an external device and configured to generate an audio output according to the sound signal wirelessly outputted from the external device.

(13)

The audio output device according to (12) above, in which, in accordance with an instruction given by a user through a user interface of the external device, the output control section controls the multiple audio outputs, the frequency analysis section makes a frequency analysis, and the frequency response compilation section compiles the frequency response of each of the audio output drivers.

(14)

The audio output device according to (12) or (13) above, in which the audio output device is configured as a wearable audio output device worn on the ears of a user, and configured to exercise control to issue a notification indicating a fitting state of the audio output device to the user through the external device according to the frequency response of each of the audio output drivers that is obtained by the frequency response compilation section.

(15)

A signal processing method executed by a signal processing device, the method including:

performing an output control process of causing multiple audio output drivers disposed in an audio output device to generate multiple audio outputs with different combinations of output frequency bands of sound signals that are to be outputted respectively from the audio output drivers;

performing a frequency analysis process of making a frequency analysis of a collected-sound signal upon generation of each of the multiple audio outputs, and obtaining the frequency response of each of the multiple audio outputs; and performing a frequency response compilation process of compiling the frequency response of each of the audio output drivers from the frequency response of each of the audio outputs that is obtained by the frequency analysis process.

REFERENCE SIGNS LIST

100: Ears
1, 1A, 1B, 1C: Headphones
2: Driver (audio output driver)
3, 3A, 3C: Frequency response measurement section
31, 31A: Output control section
32: Frequency analysis section
33: Frequency response compilation section
4: Decoder
5: Addition section
6: D/A conversion section
7: Amplification section
8: Sound collection section
9: Amplification section
10: A/D conversion section
11: NC signal generation section
12: Sound collection section
13: Amplification section
14: A/D conversion section
CT: Content sound data
15: Operating section
16: Wireless communication section
50: Host equipment
51: Wireless communication section
52: Control section
53: Operating section
54: Display section
Sc: Execution instruction signal
Ss: Notification instruction signal

The invention claimed is:

1. A signal processing device comprising:

an output control section that causes multiple audio output drivers disposed in an audio output device to generate multiple audio outputs with different combinations of output frequency bands of sound signals that are to be outputted respectively from the audio output drivers;

a frequency analysis section that makes a frequency analysis of a collected-sound signal upon generation of each of the multiple audio outputs, and obtains a frequency response of each of the multiple audio outputs; and a frequency response compilation section that compiles the frequency response of each of the audio output drivers from the frequency response of each of the multiple audio outputs that is obtained by the frequency analysis section.

2. The signal processing device according to claim 1, wherein the frequency response compilation section extracts, from the frequency response of each of the multiple audio outputs, frequency responses of frequency bands that are outputted upon generation of the respective multiple audio outputs, and combines the extracted frequency responses for each of the audio output drivers.

3. The signal processing device according to claim 1, wherein the output control section outputs a reproduction signal of a content sound as a sound signal at a time of the generation of the multiple audio outputs.

4. The signal processing device according to claim 1, wherein the output control section outputs a reproduction signal of stereophonic content as a sound signal at a time of the generation of the multiple audio outputs.

5. The signal processing device according to claim 3, wherein the output control section changes a combination of output frequency bands for each of the audio output drivers during a period in which a predetermined signal level condition is satisfied by a signal level of the sound signal.

6. The signal processing device according to claim 5, wherein the output control section performs the change during a period in which the signal level of the sound signal is equal to or lower than a predetermined signal level.

7. The signal processing device according to claim 5, wherein the output control section changes the combination of output frequency bands for each of the audio output drivers during a period in which the signal level of the sound signal is equal to or higher than a predetermined signal level.

8. The signal processing device according to claim 1, further comprising:

a signal process adjustment section that adjusts a sound signal process for each of the audio output drivers according to the frequency response of each of the audio output drivers that is obtained by the frequency response compilation section.

9. The signal processing device according to claim 8, wherein the signal process adjustment section adjusts a noise canceling signal generation process for each of the audio output drivers according to the frequency response of each of the audio output drivers.

10. The signal processing device according to claim 1, wherein, in accordance with an instruction from a user, the output control section controls the multiple audio outputs, the frequency analysis section makes a frequency analysis, and the frequency response compilation section compiles the frequency response of each of the audio output drivers.

11. An audio output device comprising:

multiple audio output drivers;

a sound collection section that collects sounds outputted from the audio output drivers;

an output control section that causes the audio output drivers to generate multiple audio outputs with different combinations of output frequency bands of sound signals that are to be outputted respectively from the audio output drivers;

a frequency analysis section that makes a frequency analysis of a collected-sound signal that is collected by the sound collection section upon generation of each of the multiple audio outputs, and obtains a frequency response of each of the multiple audio outputs; and a frequency response compilation section that compiles the frequency response of each of the audio output drivers from the frequency response of each of the multiple audio outputs that is obtained by the frequency analysis section.

12. The audio output device according to claim 11, wherein the audio output drivers are configured to be able to wirelessly communicate with an external device and configured to generate an audio output according to a sound signal wirelessly outputted from the external device.

13. The audio output device according to claim 12, wherein, in accordance with an instruction given by a user through a user interface of the external device, the output control section controls the multiple audio outputs, the frequency analysis section makes a frequency analysis, and the frequency response compilation section compiles the frequency response of each of the audio output drivers.

14. The audio output device according to claim 12, wherein the audio output device is configured as a wearable audio output device worn on ears of a user, and configured to exercise control to issue a notification indicating a fitting state of the audio output device to the user through the external device according to the frequency response of each of the audio output drivers that is obtained by the frequency response compilation section.

15. A signal processing method executed by a signal processing device, the signal processing method comprising:

performing an output control process of causing multiple audio output drivers disposed in an audio output device to generate multiple audio outputs with different combinations of output frequency bands of sound signals that are to be outputted respectively from the audio output drivers;

performing a frequency analysis process of making a frequency analysis of a collected-sound signal upon generation of each of the multiple audio outputs, and obtaining a frequency response of each of the multiple audio outputs; and performing a frequency response compilation process of compiling the frequency response of each of the audio output drivers from the frequency response of each of the multiple audio outputs that is obtained by the frequency analysis process.

* * * * *